(12) United States Patent
Sukumaran et al.

(10) Patent No.: US 9,246,924 B2
(45) Date of Patent: Jan. 26, 2016

(54) METHOD FOR SHARING SERVICE IDENTITY AMONG MULTIPLE CLIENT DEVICES IN A REAL-TIME COMMUNICATIONS NETWORK

(75) Inventors: Vrijlal Sukumaran, Bangalore (IN); Johan Samuelsson, Redwood City, CA (US); Jan Forslow, San Mateo, CA (US)

(73) Assignee: Sonim Technologies, Inc., San Mateo, CA (US)

( * ) Notice: Subject to any disclaimer, the term of this patent is extended or adjusted under 35 U.S.C. 154(b) by 1083 days.

(21) Appl. No.: 11/955,767

(22) Filed: Dec. 13, 2007

(65) Prior Publication Data
US 2009/0157799 A1    Jun. 18, 2009

(51) Int. Cl.
| | |
|---|---|
| *H04W 76/00* | (2009.01) |
| *H04W 76/04* | (2009.01) |
| *H04L 29/06* | (2006.01) |
| *G06Q 10/10* | (2012.01) |
| *H04L 29/08* | (2006.01) |
| *G06F 9/48* | (2006.01) |
| *H04W 4/10* | (2009.01) |

(52) U.S. Cl.
CPC ............ *H04L 63/102* (2013.01); *G06F 9/4856* (2013.01); *G06Q 10/10* (2013.01); *H04L 63/04* (2013.01); *H04L 67/306* (2013.01); *H04W 4/10* (2013.01); *H04W 76/005* (2013.01)

(58) Field of Classification Search
CPC . H04W 76/005; H04W 76/045; H04W 76/06; H04W 76/021; H04W 76/064; H04W 76/025; H04W 4/10
USPC ...................................... 455/435.1, 436–439
See application file for complete search history.

(56) References Cited

U.S. PATENT DOCUMENTS

| | | | | |
|---|---|---|---|---|
| 2007/0162605 | A1* | 7/2007 | Chalasani et al. | ............ 709/227 |
| 2007/0234048 | A1* | 10/2007 | Ziv | ................ 713/159 |
| 2008/0133757 | A1* | 6/2008 | Etelapera | ...................... 709/227 |
| 2009/0023435 | A1* | 1/2009 | Kuivalainen | .................. 455/419 |

FOREIGN PATENT DOCUMENTS

WO    WO 2007051489 A1 *    5/2007

\* cited by examiner

*Primary Examiner* — Marisol Figueroa
(74) *Attorney, Agent, or Firm* — Rahman LLC

(57) ABSTRACT

Methods for sharing service identity between client devices in a real-time communications network are presented including: registering a first client device with a server on the real-time communications network, the first client device registering with a shared service identity, where the first client device becomes an active client device; and when a second client device enters a physical proximity of the first client device; establishing a personal area network connection between the first client device and the second client device; registering the second client device with the server, the second client device registering with the shared service identity, where the second client device becomes the active client device and the first client device becomes a waiting device, where the waiting device discontinues communication with the server.

22 Claims, 9 Drawing Sheets

METHOD FOR SHARING SERVICE IDENTITY AMONG MULTIPLE CLIENT DEVICES IN A REAL-TIME COMMUNICATIONS NETWORK

BACKGROUND

As mobile communication devices have become a more intricate part of users' daily lives, the demand for expanded services for those devices continues to rise. Technological innovations have provided the means for many new and interesting uses for mobile communication devices to the point where mobile communication devices may be utilized efficiently for a variety of tasks including sending email, calendaring, and other functions. In addition, integration of mobile communication devices with other electronic devices is becoming increasingly popular.

For example, users of wireless communication devices may currently synchronize data with a more secure electronic device such as a computer laptop device. In this manner, a user may be assured that data is secure and available for use both from a mobile device and from a more secure data store. Using an additional device may have the added advantage of providing a friendlier user environment in some examples. In like manner, users of wireless communication devices may desire to send and receive data to and from other wireless communications devices. One example is the ability to send a contact list from one wireless device to another. By sharing data, opportunities for additional functionality are presented.

One such example of additional functionality is the ability to transfer a session between a wireless communication device and another device. In some cases, a user on an ongoing PoC session may wish to transfer an on-going PoC session to a different device. Transferring may be desirable for any number of reasons. For example, one device may have superior transmission characteristics over another device; one device may have a more user friendly interface over another device; or one device may simply have more functionality over another device. However, transferring services from one device to another over conventional communications system may require at least several server interactions to negotiate control handoffs, to properly identify devices, to update devices, and to transfer sessions, which may require an enhanced server in some examples. In addition, pre-configuration steps may be required to assure proper transfer negotiations. Thus, in some examples, transferring services may unduly load network bandwidth due to additional required server interactions that may ultimately create undesirable delays resulting in a poor user experience. As such, methods for sharing service identity among multiple client devices in a real-time communications network are presented herein.

BRIEF DESCRIPTION OF THE DRAWINGS

The present invention is illustrated by way of example, and not by way of limitation, in the figures of the accompanying drawings and in which like reference numerals refer to similar elements and in which.

Figure 1:
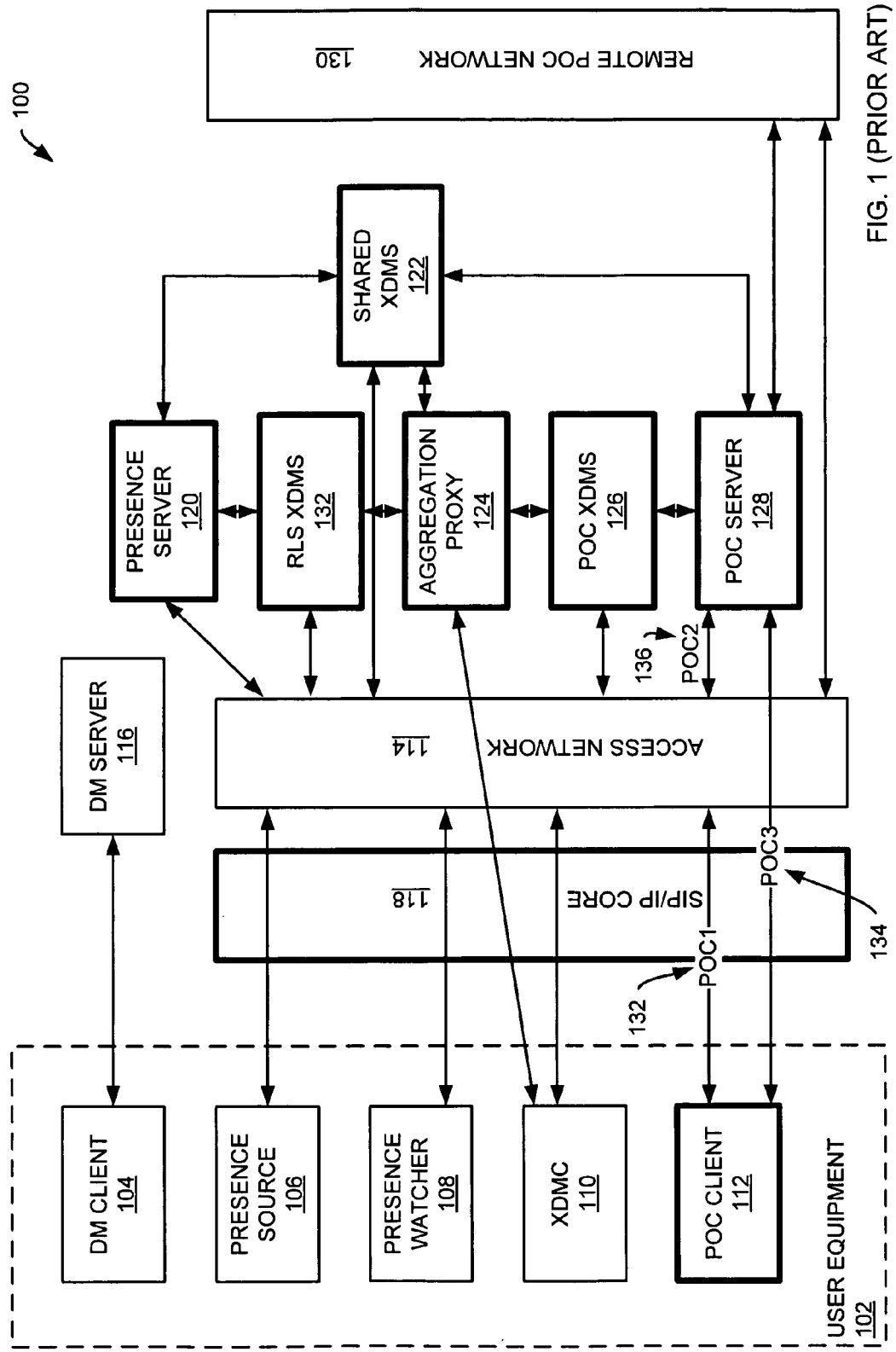
FIG. 1 is an illustrative representation of a prior art PoC System Architecture in accordance with OMA version 1 specifications.

| GLOSSARY | |
|---|---|
| Bluetooth | Bluetooth is a specification for the use of low-power radio communications to wirelessly link phones, computers and other network devices over short distances. Bluetooth technology was designed primarily to support simple wireless networking of personal consumer devices and peripherals, including cell phones, PDAs, and wireless headsets. Wireless signals transmitted with Bluetooth cover short distances, typically up to 30 feet (10 meters). Bluetooth devices generally communicate at less than 1 Mbps. |
| Communications Network | One or more servers implementing a simplex media and session processing service, as could be exemplified by a plurality of packet switching and packet processing servers implementing a PoC service as defined by the Open Mobile Alliance (OMA). |
| FM (Frequency Modulation) Wireless Communications | FM is a wireless personal communication system, e.g., for use with behind the ear hearing instruments. FM wireless communications devices help overcome the listening challenges created by noise, distance, and reverberation. For a user this can mean greater independence, mobility, and freedom to participate in situations that could otherwise be difficult or frustrating. FM wireless communications is helpful in everyday conversation, and also couples easily to other electronic sources (such as a television, stereo, computer, etc.), allowing the user to gain an edge in challenging situations. |

-continued

| GLOSSARY | |
|---|---|
| FRS - Family Radio Service | Family Radio Service is a frequency bandwidth available in North America for short range two-way radio communications. FRS radios can usually communicate over a distance of 2 miles in line of sight. FRS radios let users communicate by: pressing a talk button; speaking; and then releasing it to wait for a reply from another user. FRS two-way radios are intended for free communications during leisure activities such as a walk in a park or a visit to a shopping center. |
| IMS - IP Multimedia Subsystem | IMS is an all-IP wireless system (SIP/IP Core), where data, voice and signaling are all carried as IP packets. IMS contains SIP Proxies. |
| IR - Infrared | Infrared can be used to wirelessly connect a phone or other wireless device to various electronic devices, for various purposes. For example, IR may be configured to connect a phone to a computer so that the computer can use the phone to make a data connection (to the Internet, or for syncing, for example.) IR may also be configured to exchange information such as phone book entries with other phones. Still further, some phones can also utilized IR to send information such as phone book entries and calendar events to IR-equipped printers.<br>IR is a line-of-sight wireless technology that uses a beam of invisible light to transmit information. Thus, the infrared ports of both devices must be nearby and aimed at each other for a connection to succeed. |
| ISB - Incoming Session Barring | A PoC User may at times wish to disable the acceptance of Push-to-talk sessions while retaining SIP registration for one or more other SIP-based services. When a PoC terminal is configured to deny any incoming Push-to-talk sessions, this is known as Incoming Session Barring (ISB) or DoNotDisturb (DnD). There exists similar concepts in OMA PoC 1.0 for Instant personal Alert messages as well sessioned IAB [Incoming Alert Barring]. Other PoC Settings that will be introduced in OMA PoC 2.1 include Conditional Incoming and Outgoing Session Barring. |
| GPRS - Generic Packet Radio Service | Packet switched service on GSM networks that provides an Internet Protocol bearer for applications such as PoC. |
| GSM - Global System for Mobile communication | The second generation digital technology originally developed for Europe but which now has in excess of 71% of the world market. Initially developed for operation in the 900MHz band and subsequently modified for the 850, 1800 and 1900 MHz bands. |
| NFC - Near Field Communications | Near Field Communication (NFC) is a short-range wireless connectivity standard (Ecma-340, ISO/IEC 18092) that utilizes magnetic field induction to enable communication between devices when they're touched together, or brought within a few centimeters of each other. Jointly developed by Philips and Sony, the standard specifies a way for the devices to establish a peer-to-peer (P2P) network to exchange data. After the P2P network has been configured, another wireless communication technology, such as Bluetooth or Wi-Fi, can be used for longer range communication or for transferring larger amounts of data. |
| OMA - Open Mobile Alliance ™ | OMA is a neutral, global group that defines and promotes open standards for new mobile-phone-related technologies, focusing specifically on mobile data services, which is herein incorporated by reference in its' entirety. |
| PAN - Personal Area Network | A personal area network (PAN) is an interconnection of information technology devices within the range of an individual person, typically within a range of 10 meters. For example, a person traveling with a laptop, a personal digital assistant (PDA), and a portable printer could interconnect them without having to plug anything in, using some form of wireless technology. Typically, this kind of personal area network could also be interconnected without wires to the Internet or other networks. |
| PoC - Push-to-Talk over Cellular | PoC is a service that provides a "walkie-talkie" service utilizing VoIP technology to a number of client devices |
| PTT - Push-to-Talk | Similar to conventional walkie-talkie communication - users send a voice message to one or more recipients from a mobile phone by pushing a key. |

-continued

| GLOSSARY | |
|---|---|
| RLS XDMS - Resource List Server XML Document Management Server | The RLS XDMS is the repository for XML documents that define services which are associated with a list of resources. An example of such a service document is a Presence List, which is used by a RLS to subscribe, on behalf of a watcher, to the presence status of a list of presentities. The protocol used to access and manipulate such documents is based on the XML Configuration Access Protocol (XCAP), and described in [XDMSPEC]. This specification provides the XCAP application usage for one type of RLS-specific XML document, the Presence List. |
| Shared XDMS - Shared XML Document Management Server | An XCAP server that manages XML documents (e.g. Contact Lists) that are needed for the PoC service and which may be shared with other service enablers (e.g. Presence). |
| SIP - Session Initiation Protocol | A signaling protocol for Internet conferencing, telephony, presence, events notification, and instant messaging. The current IETF RFC is 3261. http://www.ietf.org/rfc/ffc3261.txt?number=3261 |
| UE - User Equipment | A terminal (e.g. handset or PC) with the PoC Client-Application installed. |
| Wi-Fi - Wireless Fidelity and WLAN - Wireless Local Area Network | Wireless Fidelity and is meant to be used generically when referring of any type of 802.11 network, whether 802.11b, 802.11a, dual-band, etc. The term is promulgated by the Wi-Fi Alliance. Any products tested and approved as "Wi-Fi Certified" (a registered trademark) by the Wi-Fi Alliance are certified as interoperable with each other, even if they are from different manufacturers. A user with a "Wi-Fi Certified" product can use any brand of access point with any other brand of client hardware that also is certified. Typically, however, any Wi-Fi product using the same radio frequency (for example, 2.4 GHz for 802.11b or 11g, 5 GHz for 802.11a) will work with any other, even if not "Wi-Fi Certified." Formerly, the term "Wi-Fi" was used only in place of the 2.4 GHz 802.11b standard, in the same way that "Ethernet" is used in place of IEEE 802.3. The Alliance expanded the generic use of the term in an attempt to stop confusion about wireless LAN interoperability. |
| VoIP - Voice over Internet Protocol | VoIP is an exemplary of a combination of a session signaling protocol and a media transfer protocol. VoIP is a technology that is used to transmit media in the form of digital data packets, over Internet Protocols, as opposed to using traditional telephone lines or circuit switched wireless bearers. For the purposes of this present invention packet protocols and circuit switched protocols and methods are indistinguishable. VoIP - Voice over Internet Protocol |
| XCAP - XML Configuration Access Protocol | XCAP allows a client to read, write, and modify application configuration data, stored in XML format on a server. XCAP maps XML document sub-trees and element attributes to HTTP URIs, so that these components can be directly accessed by HTTP. |
| XDMC - XML Document Management Client | An XCAP client that manages XML documents stored in the network (e.g. PoC-specific documents in the PoC XDMS, Contact Lists in the Shared XDMS, etc). |
| XDMS - XML Document Management Server | An XCAP server that manages XML documents (e.g. Contact Lists) that are utilized by various applications. Each application has its own designated XDMS (e.g. PoC XDMS) and can utilize the Shared XDMS. |

DETAILED DESCRIPTION

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described hereinbelow, including methods and techniques. It should be kept in mind that the invention might also cover articles of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include a general-purpose computer and/or a dedicated computing device when appropriately programmed and may include a combination of a computer/computing device and dedicated/programmable circuits adapted for the various tasks pertaining to embodiments of the invention.

The invention is described with reference to specific architectures and protocols. Those skilled in the art will recognize that the description is for illustration and to provide the best mode of practicing the invention. The description is not meant to be limiting. For example, reference is made to an OMA PoC system, while other types of PTT systems using any mobile or fixed access network can also benefit form the present invention. Likewise, reference is made to PTT sessions, while the present invention can be applied to other types of VOIP sessions and video conference multimedia sessions over simplex or full-duplex media path(s) and with or without floor control policies.

FIG. 1 is an illustrative representation of a prior art PoC System architecture 100 in accordance with OMA version 1 specifications. An OMA PoC system architecture 100 includes User Equipment (UE) 102 and a set of network components. As illustrated, UE 102 contains the necessary pieces to interface the user acting as participant in a push-to-talk over cellular (PoC) session under the OMA version 1 specifications. UE 102 can either be a mobile terminal, a PC or any other device connected to the access network. As utilized here, the terms UE, client device, and terminal are synonymous. Device Management (DM) client 104 inside UE 102 is used to bootstrap UE 102 with necessary configuration data from a DM server 116. An XML Document Management Client (XDMC) 110 is used to download and update by request any relevant contact lists stored in Shared XML Document Management Server (XDMS) 122.

An Aggregation Proxy 124 may be configured to perform the authentication of any such requests. Similarly, the XDMC 110 is also configured to communicate via Aggregation Proxy 124 with PoC-specific XDMS (PoC XDMS) 126 for the purpose of managing group policies and authorization lists. UE 102 further includes Presence Source 106 and Presence Watcher 108. Presence Source 106 may be configured to publish a UE's availability status to other users. Presence Watcher 108 may be configured to retrieve availability status of others (e.g. other UEs and contacts). Both UE presence entities communicate with Presence Server 120 via a SIP/IP Core 118. Presence Server 120 may be configured to utilize RLS XDMS 132, which manages group policies and lists related to Presence Server 120. As noted above, an RLS XDMS is a repository for XML documents that define services which are associated with a list of resources. An example of such a service document is a Presence List, which is used by an RLS XDMS to subscribe, on behalf of a watcher, to the presence status of a list of presentities. The protocol used to access and manipulate such documents is based on the XML Configuration Access Protocol (XCAP), and described in XDMSPEC, which is herein incorporated by reference in its entirety. This specification provides the XCAP application usage for one type of RLS-specific XML document, the Presence List. In some examples, an OMA PoC system built on top of a GPRS radio network, a SIP/IP Core is often a IP Multimedia Subsystem (IMS) as standardized by the 3rd Generation Partnership Project (3GPP). In other examples, SIP/IP Core 118 may also be referred to as a SIP Proxy.

A PoC client's main responsibilities are: session management, SIP registration, TBCP request-response management, media transmission, and media reception. Under existing standards, session management, SIP registration may be accomplished over POC-1 and POC-2 interfaces 132 and 136 respectively. Registration is discussed in further detail below for FIG. 6. Furthermore, TBCP request-response management, media transmission, and media may be accomplished over POC-3 interface 134. PoC server 128 is responsible for application level network functionality including PoC session establishment, termination, handling of TBCP messages and media switching between the participating clients.

In general, a POC-3 interface, in accordance with OMA standards, applies Talk Burst Control Protocol (TBCP) as a floor control protocol and sends media using the Real-Time Transfer Protocol (RTP). Floor control refers to permission for a UE to speak or otherwise send media. TBCP state machines are instantiated in both PoC clients and PoC servers after a successful SIP session establishment has occurred on POC-1 and POC-2 interfaces. In an OMA PoC system, when a PoC client sends a TBCP-Request message to a PoC server to ask for the permission to talk, the PoC server determines an appropriate response. That is, whether or not to grant permission based on floor availability. This response may be communicated back to the PoC client using appropriate messages (e.g. TBCP_Grant or TBCP_Deny). When a PoC server sends a TBCP_Grant message, permission to speak is granted to the requesting PoC client whereupon the requesting PoC client's media may be forwarded to other session participants. When a PoC server sends a TBCP_Deny message, permission to speak is denied to the requesting PoC client whereupon the requesting PoC client's media may be dropped by the PoC server.

Figure 2:
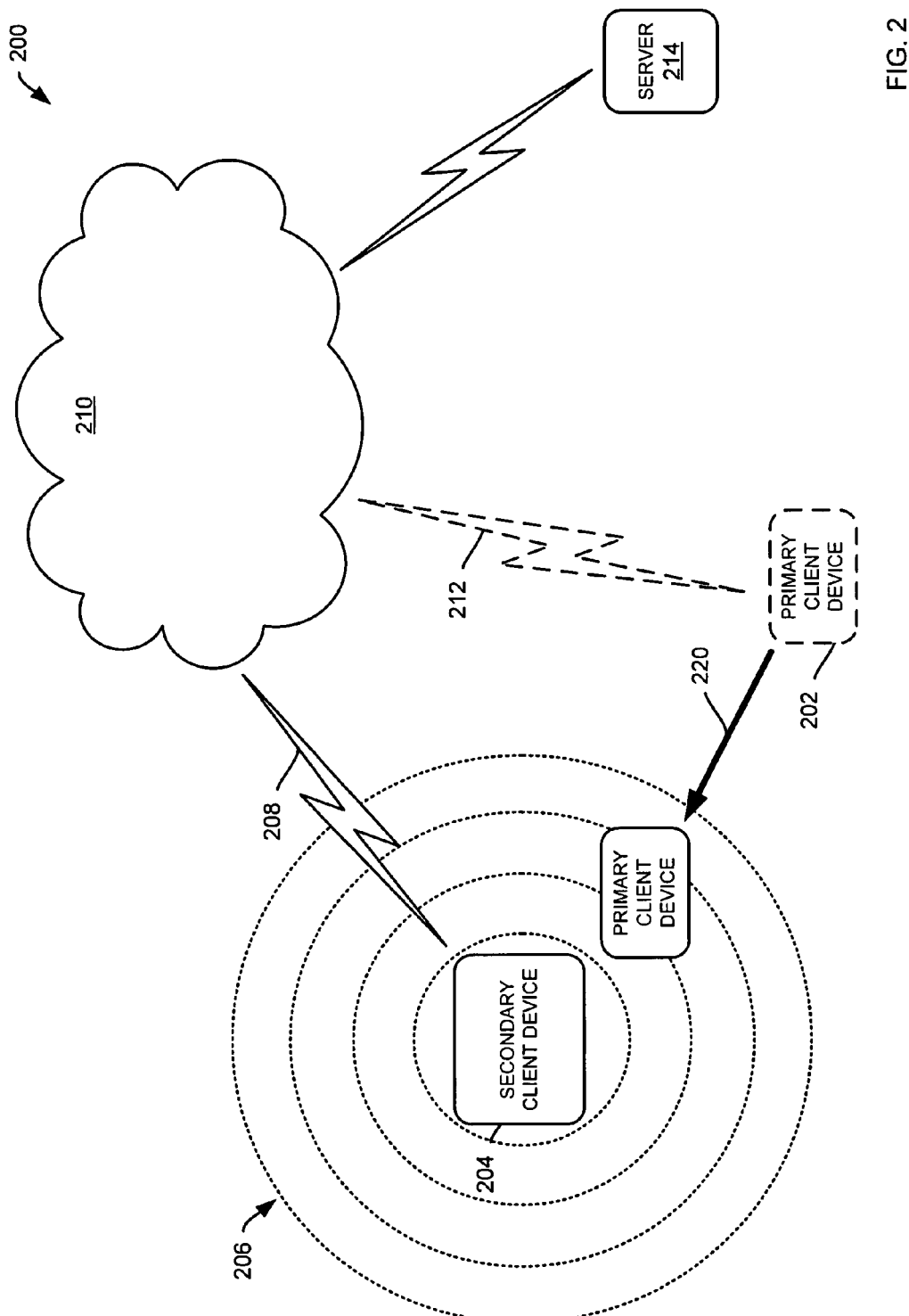
FIG. 2 is an illustrative overview of multiple client devices sharing service identity over a PoC network in accordance with embodiments of the present invention.

FIG. 2 is an illustrative overview 200 of multiple client devices sharing service identity over a real-time communications network 210 in accordance with embodiments of the present invention. In embodiments described herein, multiple client devices 202 and 204 may utilize a shared service identity so that a user may utilize either terminal for making or continuing a session. As contemplated herein, multiple client devices sharing service identity may be configured to register with server 214. It may be appreciated that although the embodiment illustrates only two client devices, any number of client devices may be utilized under embodiments without limitation. In addition, client devices may include mobile, vehicle-mounted and stationary client devices without limitation and without departing from the present invention. Primary client device 202 and secondary client device 204 may be configured to communicate with each other using any short range, personal area networking communication system such as Bluetooth wireless communication, 801.1 a-g wireless communication, infrared (IR) wireless communication, family radio service (FRS) wireless communication, near field communications NFC wireless communications and frequency modulation (FM) wireless communication without departing from the present invention.

As illustrated, an active client device, such as primary client device 202 may be in communication with server 214 over real-time communications network 210 via communication link 212. Communication link 212 may be any suitable link for transmitting and receiving communication data without departing from the present invention. When a primary client device 202 comes within physical proximity 206 of a waiting client device such as secondary client 204 as illustrated by arrow 220, secondary client device 204 may proceed to register with server 214 as the active client device over real-time communications network 210 via communication link 208. Detection of a client device within a physical proximity may be enabled in any manner well-known in the art without departing from the present invention. For example, in some embodiments, a personal area network (PAN) may be established between client devices. As noted above, a PAN is an interconnection of information technology devices within the range of an individual person, typically within a range of 10 meters. In some embodiments, a PAN implements a peerto-peer network for interdevice communication which may be configured to exchange data. In addition, once a peer-to-peer network has been configured, another wireless communication technology, such as Bluetooth or Wi-Fi, can be used for longer range communication or for transferring larger amounts of data.

Once secondary client device 204 is active, the device either remains available to begin a new session or to take over an on-going session that originated with primary client device 202. Because primary client device 202 and secondary client device 204 negotiate with each other to establish the status of the devices, no intervention is required by server 214 to manage a control transfer from the primary client device to the secondary client device. Once secondary client device 204 has properly registered as the active client device, it is secondary client device 204 that continues communication with real-time communications network 210. Thus, while secondary client device 204 is the active client device; primary client device 202 becomes the waiting client device. Additionally, while secondary client device 204 is the active client device, secondary client device 204 continues to update primary client device 202 with status information received from server 214. In some conventional systems, waiting client devices may not be updated. Furthermore, in conventional systems where waiting client devices are updated, updating typically proceeds through a server and not through an active client device.

When a waiting client device such as primary client device 202 leaves physical proximity 206 of secondary client device 204, primary client device 202 may proceed to register with server 214 as the active client device. Primary client device 202 then either stands ready to begin a new session or takes over an on-going session that originated with secondary client device 204. Re-taking the session is feasible, at least in part, because updated status information is shared between clients as noted above, so transferring sessions is relatively transparent and session integrity may be maintained. As may be appreciated, sessions may be initiated on any network enabled communication device. In some embodiments, client devices 202 and 204 are PoC client devices, server 214 is a PoC server, and real-time communications network 210 is a PoC network. In other embodiments, the real-time communications network is a VOIP enabled network. In addition, communication link 208 may be wired or wireless communication links without limitation and without departing from the present invention.

Figure 3A:
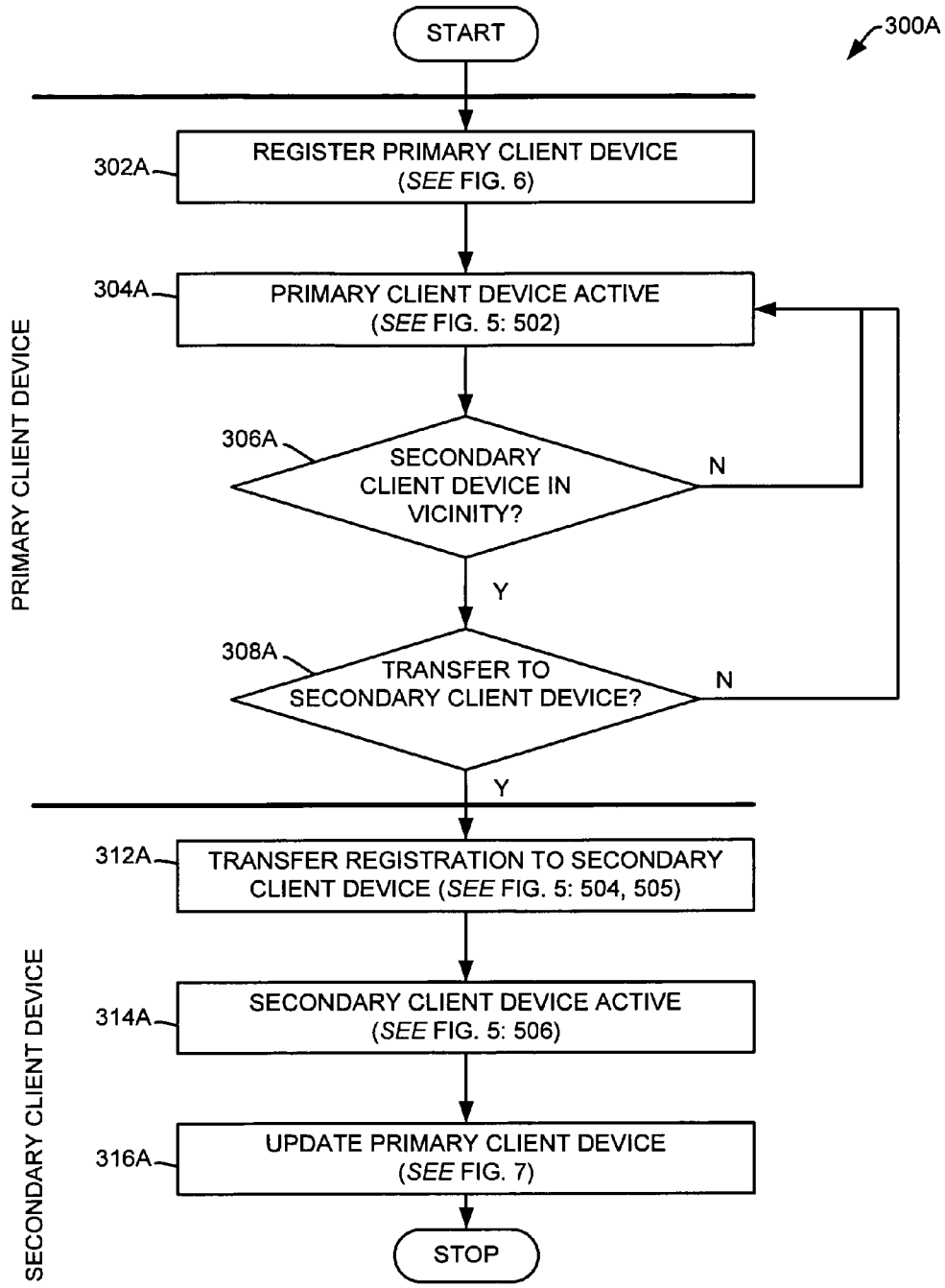
FIGS. 3A-B are illustrative flowcharts of methods for sharing a service identity between multiple client devices over a real-time communications network in accordance with embodiments of the present invention.
Figure 5:
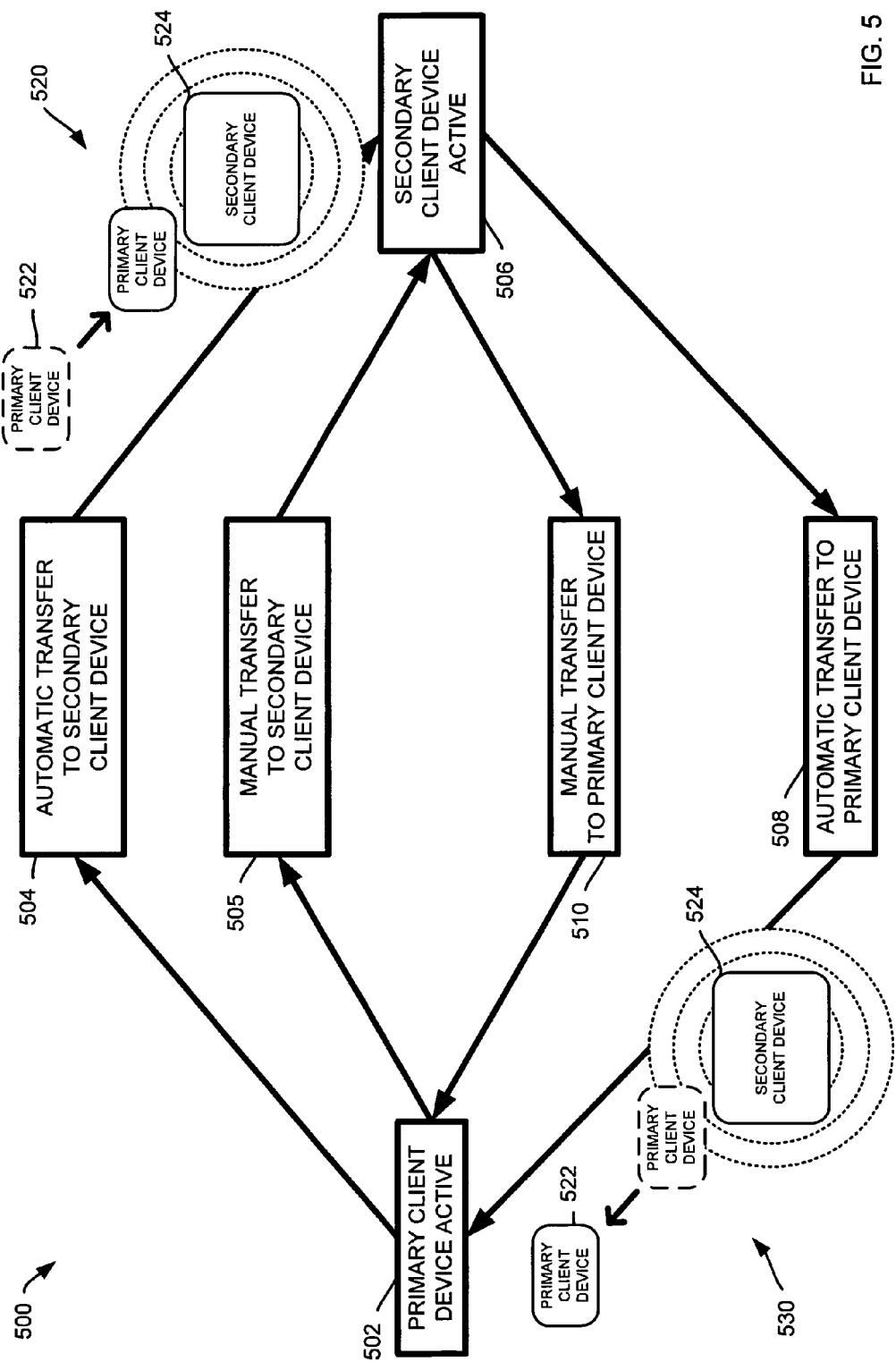
FIG. 5 is an illustrative diagram of transition states for multiple client devices that share a service identity over a PoC network in accordance with embodiments of the present invention.

FIG. 3A is an illustrative flowchart 300A of methods for sharing a service identity between multiple client devices over a real-time communications network in accordance with embodiments of the present invention. FIG. 3A will be discussed with references to FIG. 5 for clarity in understanding embodiments described herein. FIG. 5 is an illustrative diagram 500 of transition states for multiple client devices that share a service identity over a PoC network in accordance with embodiments of the present invention. At a first step 302A, the method registers a primary client device on a server. Registration is discussed in further detail below for FIG. 6. When a client device is registered on a server, that client device may be denoted as an active client device. As noted above, in some embodiments, the server is a PoC server. Registration designates a client device as an active client device that may initiate sessions and maintain communication with a server. At a next step 304A, the method denotes that a primary client device is active. Referring briefly to FIG. 5, a step 304A is further represented as a PRIMARY ACTIVE transition state 502. During a PRIMARY ACTIVE transition state, all communications with a server are handled by a primary client device. As may be appreciated, any number of client devices, each sharing a service identity, may be utilized under embodiments without limitation.

Returning to FIG. 3A, at a next step 306A, the method determines whether a secondary client device is within a physical proximity of a secondary client device. Monitoring for a device may be accomplished in any manner well-known in the art without departing from the present invention. In some embodiments, as noted above, a PAN may be established when devices come within a broadcast range of one another. Thus, if a PAN is established, then a secondary client device is in the vicinity of a primary client device. If the method determines at a step 306A that a secondary client device is not in the vicinity, the method continues to a step 304A. If the method determines at a step 306A that a secondary client device is in the vicinity, then the method continues to a step 308A to determine whether to transfer to a secondary client device.

If the method determines at a step 308A not to transfer registration to a secondary client device, the method continues to a step 304A. If the method determines at a step 308A to transfer registration to a secondary client device, then the method continues to a step 312A to transfer registration to a secondary client device having a shared identity. Referring briefly to FIG. 5, transferring is further represented as transition states 504 and 505. In addition, transition 520 illustrates a primary client device 522 entering a physical proximity of secondary client device 524. In embodiments, transfer may be accomplished either automatically (i.e. 504), manually (i.e. 505), or any combination thereof without limitation. In embodiments, transferring registration to a secondary client device includes registering a secondary client device with a server where the secondary client device shares a service identity with a primary client device. As noted above, registration designates a client device as an active client device that may initiate sessions and maintain communication with a server. Thus, a secondary client device becomes an active client device.

Thus, once transfer is complete, the secondary client device becomes active at a step 314A. Referring again to FIG. 5, a step 314A is further represented as a SECONDARY ACTIVE transition state 506. During a SECONDARY ACTIVE transition state. In this state, all communications with a server are handled by a secondary client device. Status updates may be first forwarded to the secondary client device by the primary client device and subsequently forwarded by the secondary client device (i.e. active client device) to the primary client device (i.e. waiting client device) over the PAN so that session integrity may be maintained. As such, returning to FIG. 3A, the method continues to a step 316A to update the primary client device by the secondary client device. As noted above, server intervention is not required in embodiments described herein for determining whether to transfer a session or for maintaining session integrity between a primary client device and a secondary client device in embodiments described herein. In contrast, conventional systems may require at least some server intervention when determining whether to transfer a session or when maintaining session integrity between a primary client device and a secondary client device, which may, in some examples, adversely affect network traffic. In some embodiments, a secondary client device sends server updates a primary client device over a short range communication link to keep a primary client device updated. Updating is discussed in further detail below for FIG. 7.

As noted above, determining physical proximity of a client device may be accomplished in any manner well-known in the art without departing from the present invention. In some embodiments, a step 306A may be configured to determine whether a tertiary client device enters a physical proximity of a secondary client device (not illustrated). In those embodiments, methods may automatically or manually transfer a session to a third client device. Any number of client devices sharing a service identity may be configured for registering with a server and maintaining a session without limitation and without departing from the present invention. The method then ends. In embodiments, ending a session may be user initiated or system initiated without limitation.

Figure 3B:
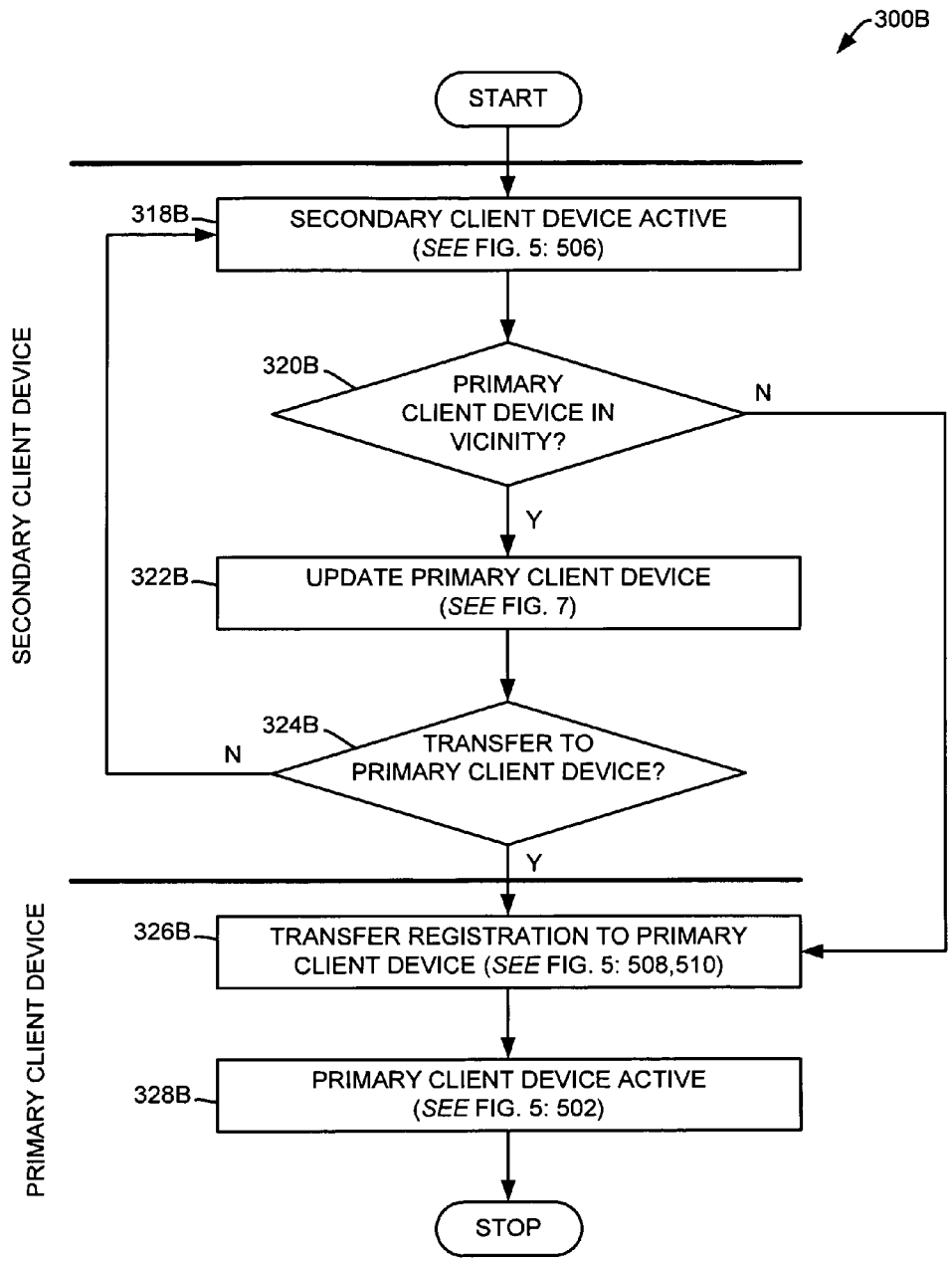

FIG. 3B is an illustrative flowchart 300B of methods for transferring a session from a secondary client device to a primary client device that share a service identity over a real-time communications network in accordance with embodiments of the present invention. In some embodiments, the real-time communications network is a PoC network. As with FIG. 3A, FIG. 3B will be discussed with references to FIG. 5 for clarity in understanding embodiments described herein. FIG. 5 is an illustrative diagram 500 of transition states for multiple client devices that share a service identity over a PoC network in accordance with embodiments of the present invention. As may be appreciated, in some embodiments, it may be desirable to transfer from a secondary client device to a primary client device. As such, the illustrated flowchart begins with a secondary client device all ready active such as continuing from a step 316A (FIG. 3A). Thus, at a first step, 318B, a secondary client device is active. Referring briefly to FIG. 5, a step 318B is further represented as a SECONDARY ACTIVE transition state 506. As noted above, during a SECONDARY ACTIVE transition state, all communications with a server are handled by a secondary client device. Status updates may be forwarded by the secondary client device (i.e. active client device) to the primary client device (i.e. waiting client device) so that session integrity may be maintained.

At a next step 320B, the method determines whether a primary client device is within a physical proximity of a secondary client device. Monitoring for a device may be accomplished in any manner well-known in the art without departing from the present invention. In some embodiments, as noted above, a PAN may be established when devices come within a broadcast range of one another. Thus, if a PAN is established, then a secondary client device is in the vicinity of a primary client device. If the method determines at a step 320B that a primary client device is not in the vicinity, the method continues to a step 326B. If the method determines at a step 320B that a primary client device is in the vicinity, the method continues to a step 322B to update the primary client device by the secondary client device to maintain session integrity. As noted above, server intervention is not required in embodiments described herein for determining whether to transfer a session or for maintaining session integrity between a primary client device and a secondary client device in embodiments described herein. In contrast, conventional systems may require at least some server intervention when determining whether to transfer a session or when maintaining session integrity between a primary client device and a secondary client device, which may, in some examples, adversely affect network traffic. In some embodiments, a secondary client device sends server updates a primary client device over a short range communication link to keep a primary client device updated. Updating is discussed in further detail below for FIG. 7.

At a next step 324B, the method determines whether to transfer registration to a primary client device. If the method determines at a step 324B not to transfer registration, the method continues to a step 318B. If the method determines at a step 324B to transfer registration to a primary client device, then registration is transferred at a step 326B, to a primary client device having a shared identity. Referring briefly to FIG. 5, transfer is further represented as transition states 508 and 510. In addition, transition 530 illustrates a primary client device 522 leaving a physical proximity of secondary client device 524. In embodiments, transfer may be accomplished either automatically (i.e. 508), manually (i.e. 510), or any combination thereof without limitation. In embodiments, transferring registration to a primary client device includes registering a primary client device with a server where the primary client device shares a service identity with a secondary client device. As noted above, registration designates a client device as an active client device that may initiate sessions and maintain communication with a server. Thus, a primary client device becomes an active client device at a step 328B. Referring again to FIG. 5, a step 328B is further represented as a PRIMARY ACTIVE transition state 502. During a PRIMARY ACTIVE transition state, all communications with a server are handled by a primary client device. The method then ends.

Figure 4A:
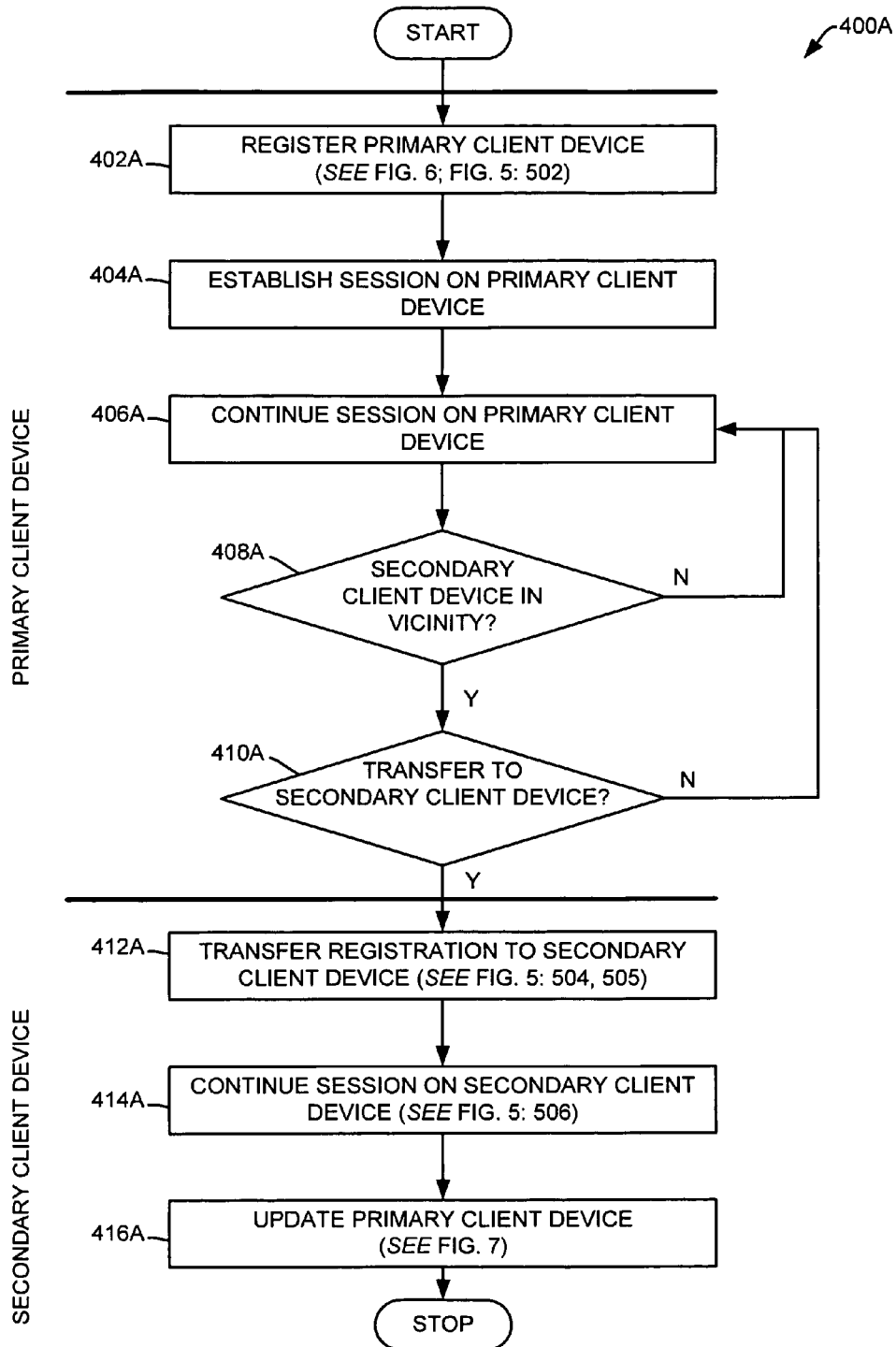
FIGS. 4A-B are illustrative flowcharts of methods for transferring a session between multiple client devices that share a service identity over a real-time communications network in accordance with embodiments of the present invention.

FIG. 4A is an illustrative flowchart 400A of methods for transferring a session from a primary client device to a secondary client device that share a service identity over a real-time communications network in accordance with embodiments of the present invention. In some embodiments, the real-time communications network is a PoC network. FIG. 4A will be discussed with references to FIG. 5 for clarity in understanding embodiments described herein. FIG. 5 is an illustrative diagram 500 of transition states for multiple client devices that share a service identity over a PoC network in accordance with embodiments of the present invention. At a first step 402A, the method registers a primary client device on a server. Registration is discussed in further detail below for FIG. 6. When a client device is registered on a server, that client device may be denoted as an active client device. As noted above, in some embodiments, the server is a PoC server. Registration designates a client device as an active client device that may initiate sessions and maintain communication with a server. Referring briefly to FIG. 5, a step 402A is further represented as a PRIMARY ACTIVE transition state 502. During a PRIMARY ACTIVE transition state, all communications with a server are handled by a primary client device. As may be appreciated, any number of client devices, each sharing a service identity, may be utilized under embodiments without limitation.

Returning to FIG. 4A, at a next step 404A, the method establishes a session on a primary client device. In some embodiments, the session is a PoC session. In other embodiments, the session is a videoconferencing multimedia session. In addition, sessions may utilize simplex or full-duplex media paths without departing from the present invention. A session, as contemplated herein, may be established in any manner well-known in the art without departing from the present invention. At a next step 406A, the method continues the established session on a primary client device. At a next step 408A, the method determines whether a secondary client device is within a physical proximity of a secondary client device. Monitoring for a device may be accomplished in any manner well-known in the art without departing from the present invention. In some embodiments, as noted above, a PAN may be established when devices come within a broadcast range of one another. Thus, if a PAN is established, then a secondary client device is in the vicinity of a primary client device. If the method determines at a step 408A that a secondary client device is not in the vicinity, the method continues to a step 406A to continue the established session on a primary device. If the method determines at a step 408A that a secondary client device is in the vicinity, then the method continues to a step 410A to determine whether to transfer the session to a secondary client device.

If the method determines at a step 410A not to transfer the session, the method continues to a step 406A to continue the established session on a primary device. If the method determines at a step 410A to transfer the session, the method continues to a step 412A to transfer a session to a secondary client device having a shared identity. Referring briefly to FIG. 5, transferring is further represented as transition states 504 and 505. In addition, transition 520 illustrates a primary client device 522 entering a physical proximity of secondary client device 524. In embodiments, transferring a session may be accomplished either automatically (i.e. 504), manually (i.e. 505), or any combination thereof without limitation. In embodiments, transferring a session to a secondary client device typically includes at least three discrete steps. A first step includes registering a secondary client device with a server where the secondary client device shares a service identity with a primary client device. As noted above, registration designates a client device as an active client device that may initiate sessions and maintain communication with a server. Thus, a secondary client device becomes an active client device. A second step includes leaving the session in progress by the primary client device. A third step includes joining a secondary client device with a session in progress. In this manner on-going sessions or session services may not be disrupted.

Once transfer is complete, the secondary client device continues the session at a step 414A. Referring again to FIG. 5, a step 414A is further represented as a SECONDARY ACTIVE transition state 506. During a SECONDARY ACTIVE transition state. In this state, all communications with a server are handled by a secondary client device. Status updates may be first forwarded to the secondary client device by the primary client device and subsequently forwarded by the secondary client device (i.e. active client device) to the primary client device (i.e. waiting client device) over the PAN so that session integrity may be maintained. As such, returning to FIG. 4A, the method continues to a step 416A to update the primary client device by the secondary client device. As noted above, server intervention is not required in embodiments described herein for determining whether to transfer a session or for maintaining session integrity between a primary client device and a secondary client device in embodiments described herein. In contrast, conventional systems may require at least some server intervention when determining whether to transfer a session or when maintaining session integrity between a primary client device and a secondary client device, which may, in some examples, adversely affect network traffic. In some embodiments, a secondary client device sends server updates a primary client device over a short range communication link to keep a primary client device updated. Updating is discussed in further detail below for FIG. 7.

As noted above, determining physical proximity of a client device may be accomplished in any manner well-known in the art without departing from the present invention. In some embodiments, a step 408A may be configured to determine whether a tertiary client device enters a physical proximity of a secondary client device (not illustrated). In those embodiments, methods may automatically or manually transfer a session to a third client device. Any number of client devices sharing a service identity may be configured for registering with a server and maintaining a session without limitation and without departing from the present invention. The method then ends. In embodiments, ending a session may be user initiated or system initiated without limitation.

Figure 4B:
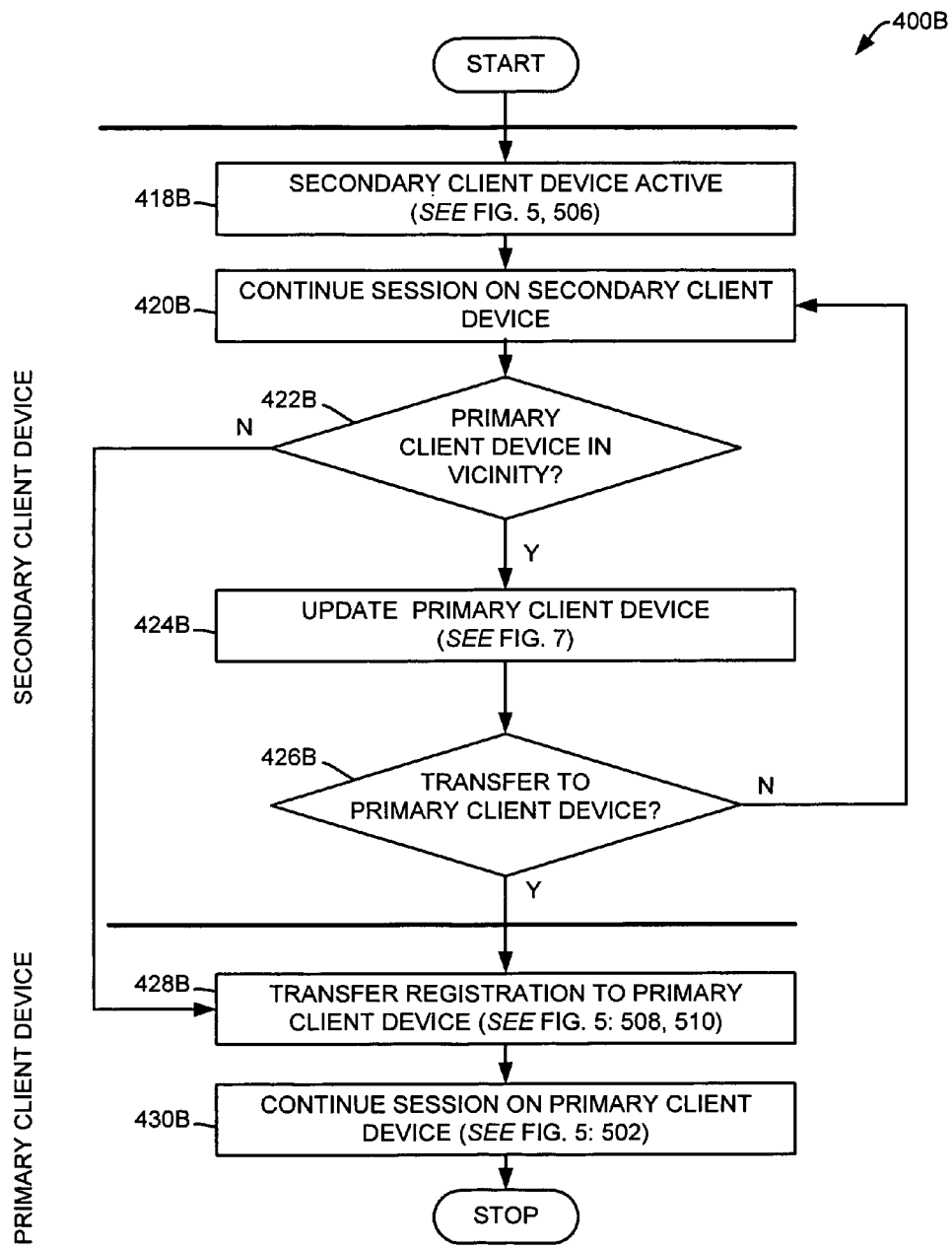

FIG. 4B is an illustrative flowchart 400B of methods for transferring a session from a secondary client device to a primary client device that share a service identity over a real-time communications network in accordance with embodiments of the present invention. In some embodiments, the real-time communications network is a PoC network. As with FIG. 4A, FIG. 4B will be discussed with references to FIG. 5 for clarity in understanding embodiments described herein. FIG. 5 is an illustrative diagram 500 of transition states for multiple client devices that share a service identity over a PoC network in accordance with embodiments of the present invention. As may be appreciated, in some embodiments, it may be desirable to transfer an ongoing session from a secondary client device to a primary client device. As such, the illustrated flowchart begins with a session all ready transferred to a secondary client device such as continuing from a step 416A (FIG. 4A). Thus, at a first step, 418B, a secondary client device is active. Referring briefly to FIG. 5, a step 418B is further represented as a SECONDARY ACTIVE transition state 506. As noted above, during a SECONDARY ACTIVE transition state, all communications with a server are handled by a secondary client device. Status updates may be forwarded by the secondary client device (i.e. active client device) to the primary client device (i.e. waiting client device) so that session integrity may be maintained. At a next step 420B, the method continues an established session on a secondary device.

At a next step, 422B, the method determines whether a primary client device is within a physical proximity of a secondary client device. Monitoring for a device may be accomplished in any manner well-known in the art without departing from the present invention. In some embodiments, as noted above, a PAN may be established when devices come within a broadcast range of one another. Thus, if a PAN is established, then a secondary client device is in the vicinity of a primary client device. If the method determines at a step 422B that a primary client device is not in the vicinity, the method continues to a step 428B. If the method determines at a step 422B that a primary client device is in the vicinity, the method continues to a step 424B to update the primary client device by the secondary client device to maintain session integrity. As noted above, server intervention is not required in embodiments described herein for determining whether to transfer a session or for maintaining session integrity between a primary client device and a secondary client device in embodiments described herein. In contrast, conventional systems may require at least some server intervention when determining whether to transfer a session or when maintaining session integrity between a primary client device and a secondary client device, which may, in some examples, adversely affect network traffic. In some embodiments, a secondary client device sends server updates a primary client device over a short range communication link to keep a primary client device updated. Updating is discussed in further detail below for FIG. 7.

At a next step 426B, the method determines whether to transfer the session to a primary client device. If the method determines at a step 426B not to transfer the session, the method continues to a step 420B to continue the session on a secondary client device. If the method determines at a step 426B to transfer the session, the session is transferred to a primary client device having a shared identity at a step 428B. Referring briefly to FIG. 5, transfer is further represented as transition states 508 and 510. In addition, transition 530 illustrates a primary client device 522 leaving a physical proximity of secondary client device 524. In embodiments, transfer may be accomplished either automatically (i.e. 508), manually (i.e. 510), or any combination thereof without limitation. In embodiments, transferring to a primary client device typically includes at least three discrete steps. A first step includes registering a primary client device with a server where the primary client device shares a service identity with a secondary client device. As noted above, registration designates a client device as an active client device that may initiate sessions and maintain communication with a server. Thus, a primary client device becomes an active client device. A second step includes leaving the session in progress by the secondary client device. A third step includes joining a primary client device with a session in progress. In this manner on-going sessions or session services may not be disrupted.

Once transfer is complete, the primary client device continues the session at a step 430B. Referring again to FIG. 5, a step 430B is further represented as a PRIMARY ACTIVE transition state 502. During a PRIMARY ACTIVE transition state, all communications with a server are handled by a primary client device. The method then ends.

Figure 6:
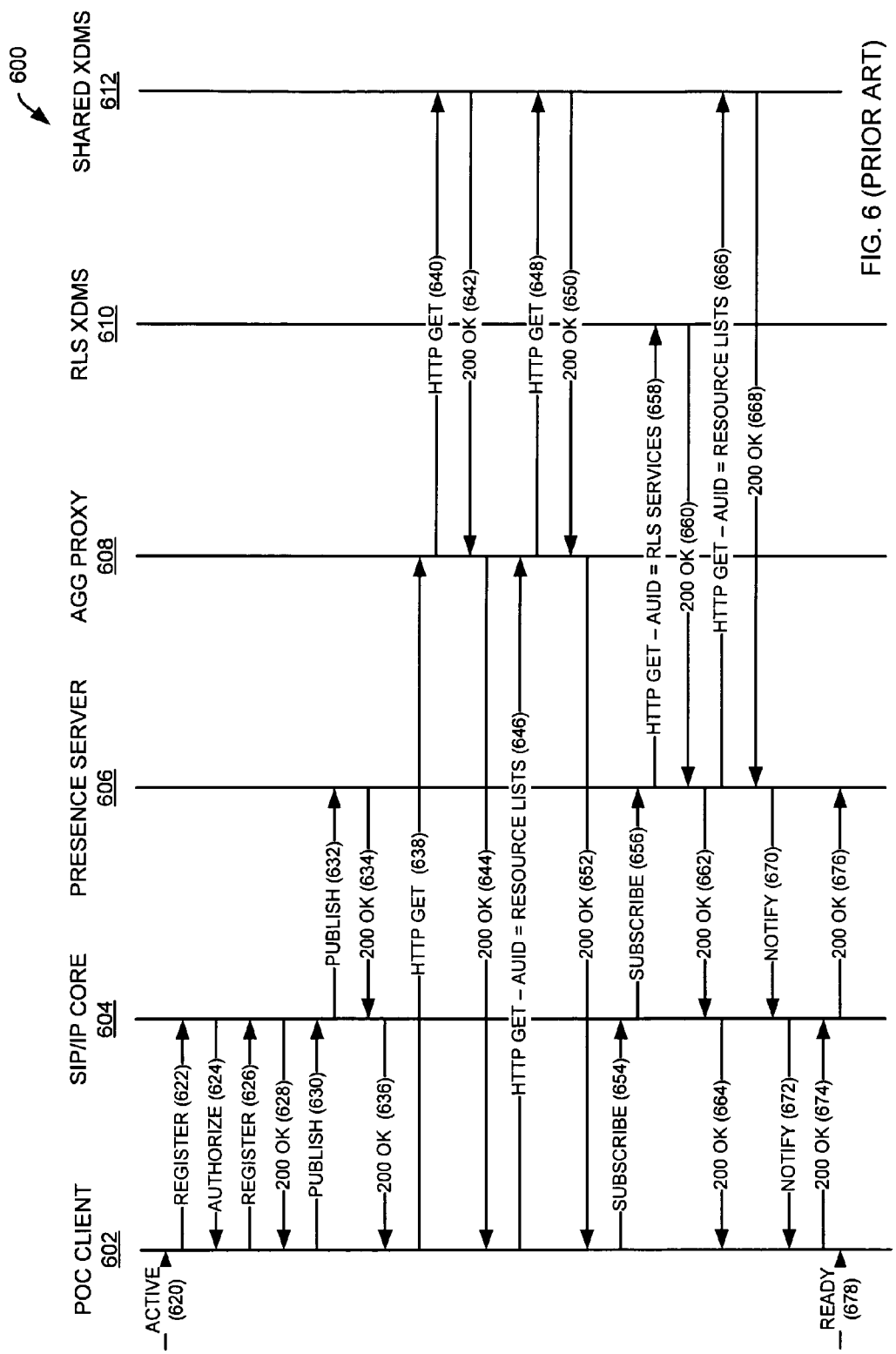
FIG. 6 is an illustrative prior art dataflow for registering a terminal over a PoC network.

FIG. 6 is an illustrative prior art dataflow 600 for registering a terminal over a PoC network. The dataflow illustrated includes sending messages between PoC entities such as: PoC client 602, SIP/IP Core 604, Presence Server 606, Aggregation Proxy 608, RLS XDMS 610, and Shared XDM 612. PoC entities are discussed in further detail above for FIG. 1. The dataflow begins when a PoC client device is turned on or is detected at 620. As may be appreciated, PoC client may include a primary client device, a secondary client device, or any number of client devices without limitation. PoC client 602 sends a registration message 622 to SIP/IP Core 604. SIP/IP Core 604 returns an authorization challenge message 624 to PoC client 602, whereupon PoC client 602 returns credentials 626 required for authorization. Upon accepting credentials 626, SIP/IP Core 604 returns a 200 OK message 628 to PoC client 602. PoC client 602 then sends a PUBISH Mode/ISB message (not shown) to a PoC server in order to upload user preferences. A PUBLISH Mode/ISB message may include Incoming Session Barring (ISB), Incoming Alert Barring (IAB), various forms of Conditional Outgoing/Incoming Barring and other device capabilities such as Simultaneous Session Support (SSS). As may be appreciated, other PoC Settings may be envisioned without departing from the present invention.

PoC client 602 then sends presence information 630/632 to Presence Server 606, whereupon Presence Server 606 returns a 200 OK message 634/636. PoC client 602 may then request additional information 638/640 from Shared XDMS 612 via Aggregation Proxy 608, whereupon Shared XDMS 612 returns a 200 OK message 642/644 to PoC client 602. Additional information may, in some embodiments, include contact lists, addresses, presence status, and the like. PoC client 602 may then request resource lists 646/648 from Shared XDMS 612 via Aggregation Proxy 608, whereupon Shared XDMS 612 returns a 200 OK message 650/652 to PoC client 602. PoC client may then request presence status 654/656 of contacts received from Presence Server 606 via SIP/IP Core 604. Upon receiving request 656, Presence Server 606 requests referred resource lists 658 from RLS XDMS 610, whereupon RLS XDMS 610 returns a 200 OK message 660/662/664 to PoC client 602. Presence server 606 may then request status of individual contacts 666 from Shared XDMS 612, whereupon Shared XDMS 612 returns a 200 OK message 668 to Presence Server 606. Presence Server 606 may then notify 670/672 PoC client 602 with presence information for each contact list, whereupon PoC client 602 returns a 200 OK message 674/676 to Presence Server 606. The dataflow ends with PoC client 602 in a ready state 678.

Figure 7:
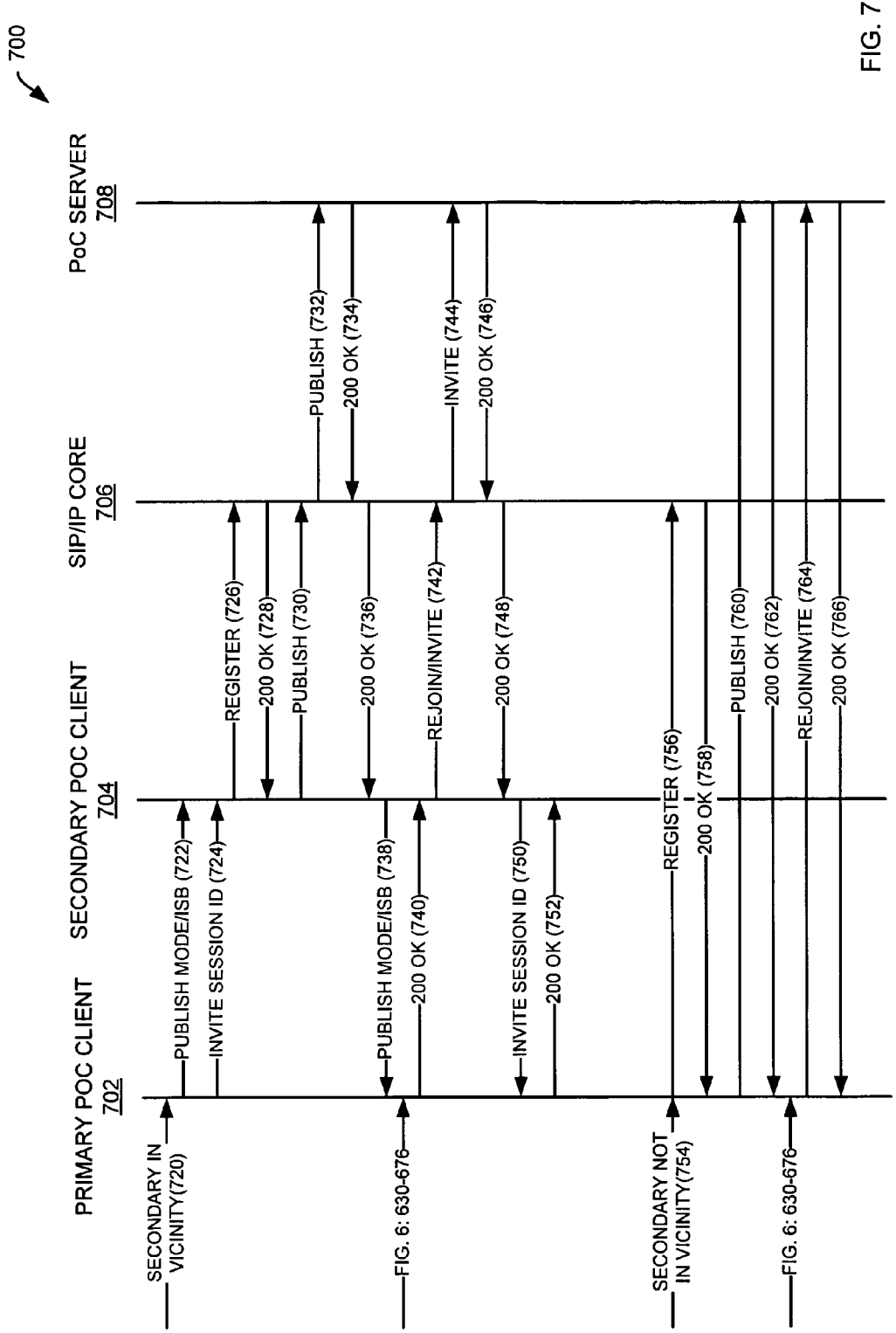
FIG. 7 is an illustrative dataflow for utilizing multiple client devices that share a service identity over a PoC network in accordance with embodiments of the present invention.

FIG. 7 is an illustrative dataflow 700 for utilizing multiple client devices that share a service identity over a PoC network in accordance with embodiments of the present invention. The dataflow illustrated includes message sending between PoC entities such as: primary PoC client 702, secondary PoC client 704, SIP/IP Core 706, and PoC Server 708. PoC entities are discussed in further detail above for FIG. 1. The dataflow begins when a secondary PoC client device is detected 720 (see FIG. 3, step 306; FIG. 5, 520). After a secondary PoC client device is detected, if the primary PoC client decides to transfer, then primary PoC client 702 sends current PoC settings status 722 to secondary PoC client 704 so that secondary PoC client 704 may publish the same status as the primary PoC client in order to properly transfer. Publishing the same status is necessary because a PoC client, such as is described in embodiments herein, is considered to be a "master" while a server is considered to be a "slave" with respect to PoC settings. Additionally, without a same status, a transferring client device may send conflicting default settings. As such it is important that PoC settings from a primary PoC client are shared to a secondary PoC client device at transfer in order to avoid publishing the incorrect PoC settings. Current PoC settings, in some embodiments, may include a shared service identity. Utilizing a shared service identity, as described herein, provides for dynamic sharing of service identity between clients to avoid an otherwise required pre-configuration step for assigning shared service identity to any secondary PoC clients. By sharing service identities in this manner, it is possible to use any secondary PoC client for multiple primary PoC clients. This sharing occurs without the intervention of PoC server 708. Continuing, primary PoC client 702 then sends session ID 724 to secondary PoC client 704 if any ongoing sessions are to be transferred as well.

Secondary PoC client 704 may then register 726 with SIP/IP Core 706, whereupon SIP/IP Core 706 returns a 200 OK message 728 to secondary PoC client 704. Registration is discussed in further detail above for FIG. 6. Secondary PoC client 704 may then send PoC settings (PUBLISH) 730/732 to PoC server 708, whereupon PoC server 708 returns a 200 OK message 734/736 to secondary PoC client 704. Secondary PoC client 704, in keeping primary PoC client 702 updated, sends update 738 to primary PoC client 702. Notably, once transfer is complete, primary PoC client 702 is updated only through secondary PoC client 704 and not through PoC server 708. At this point, secondary PoC client 704 undergoes steps 603 to 676 as described in FIG. 6 in order to register with PoC server 708. Primary PoC client 702 then returns a 200 OK message 740 to secondary PoC client 704. If primary PoC client 702 was in a session before transfer, secondary PoC client 704 may now join the session by sending message 742/744 to PoC server 708, whereupon PoC server 708 returns a 200 OK message 746/748 to secondary PoC client 704. If primary PoC client 702 was not in a session before transfer, secondary PoC client 704 will remain active until it has been depowered or it has left the vicinity of primary PoC client 702.

Secondary PoC client 704 then updates primary PoC client 702 with invite session ID information 750 so that primary PoC client 702 may join the session if secondary PoC client 704 goes out of service. Primary PoC client 702 then returns a 200 OK message 752 to secondary PoC client 704. In embodiments, updating PoC Settings and ongoing Invite Session Id generally occurs with any change in status on secondary PoC client 704. Thus, whenever a change in status occurs in a secondary PoC client, an update is sent to a primary PoC client from the secondary PoC client. In this manner, a primary PoC client is updated without increasing overall network traffic since communication between secondary and primary PoC clients is provided over a short range communication link. If a secondary PoC client leaves the physical proximity or vicinity 754, updated primary PoC client 702 may register 756 with SIP/IP Core 706, whereon SIP/IP Core returns a 200 OK message 758 to primary PoC client 702. Registration is discussed in further detail above for FIG. 6.

Primary PoC client 702 may then send updated PoC settings (PUBLISH) 760 to PoC server 708, whereupon PoC server 708 returns a 200 OK message 762 to primary PoC client 702. At this point, primary PoC client 702 undergoes steps 603 to 676 as described in FIG. 6 in order to register with PoC server 708. If secondary PoC client 704 was in a session before transfer, primary PoC client 702 may now join the session by sending message 764 to PoC server 708, whereupon PoC server 708 returns a 200 OK message 766 to primary PoC client 702. In some embodiments, transfer from a secondary PoC client to a primary PoC client may occur automatically when a secondary PoC client and a primary PoC client become separated from each other. In other embodiments, transfer form a secondary PoC client to a primary PoC client may occur manually.

While this invention has been described in terms of several embodiments, there are alterations, permutations, and equivalents, which fall within the scope of this invention. It should also be noted that there are many alternative ways of implementing the methods and apparatuses of the present invention. Furthermore, unless explicitly stated, any method embodiments described herein are not constrained to a particular order or sequence. Further, the Abstract is provided herein for convenience and should not be employed to construe or limit the overall invention, which is expressed in the claims. It is therefore intended that the following appended claims be interpreted as including all such alterations, permutations, and equivalents as fall within the true spirit and scope of the present invention.

What is claimed is:

1. A method for sharing service identity between at least two client devices in a real-time communications network, the method comprising:
   registering a first client device with a server on the real-time communications network, the first client device registering with a shared service identity, wherein the first client device becomes an active client device; and
   when at least one additional client device enters a physical proximity of the first client device; establishing a personal area network connection between the first client device and at least one additional client device;
   registering the at least one additional client device with the server, the at least one additional client device registering with the shared service identity, wherein the at least one additional client device becomes the active client device and the first client device becomes a waiting device, wherein the waiting device discontinues communication with the server; and
   when the first client device leaves the physical proximity of the at least one additional client device as detected by the personal area network connection, re-registering the first client device with the server on the real-time communications network, the first client device registering with the shared service identity, wherein the first client device becomes the active client device and the at least one additional client device becomes the waiting device.

2. The method of claim 1, further comprising:
   after the registering the at least one additional client device, updating the at least one additional client device by the first client device with status information over a peer-to-peer protocol, to maintain incoming session barring and session integrity; and
   on a state change, updating the first client device by the at least one additional client device with status information.

3. The method of claim 1, further comprising:
   establishing a session on the first client device, wherein the session is established after registering the first client device;
   after registering the at least one additional client device;
      leaving the session by the first client device; and
      joining the session by the at least one additional client device, wherein the session is transferred to the at least one additional client device; and
   continuing the session on the at least one additional client device.

4. The method of claim 1, further comprising:
   establishing a session on the at least one additional client device, wherein said session is established after registering the at least one additional client device;
   after re-registering the first client device;
      leaving the session by the at least one additional device; and
      joining the session by the first client device, wherein the session is transferred to the first client device; and
   continuing the session on the first client device.

5. The method of claim 1, wherein the registering of the at least one additional client device is performed by one of automatically registering when the first client device is within the physical proximity of the at least one additional client device, and manually registering upon a user input when the first client device is within the physical proximity of the at least one additional client device.

6. The method of claim 1, wherein the re-registering of the first client device is performed by one of automatically registering when the first client device leaves the physical proximity of the at least one additional client device, and manually registering upon a user input when the first client device leaves the physical proximity of the at least one additional client device.

7. The method of claim 3, wherein the session is a push-to-talk over cellular (PoC) session, wherein the first client device and the at least one additional client device are PoC client devices, wherein the server is a PoC server, and wherein the real-time communications network is a PoC enabled network.

8. The method of claim 1, wherein the real-time communications network is selected from one of: a VOIP enabled network and a video conference multimedia enabled network, wherein the network utilizes a communication path selected from one of a simplex media path and a full-duplex media path.

9. The method of claim 1, wherein the first client device and the at least one additional client device are devices selected from one of: a hand-held mobile device, a vehicle-mounted device, and a stationary device.

10. The method of claim 1, wherein the shared service identity is an identity selected from one of: a Session Initiation Protocol Uniform Resource Identifier (SIP URI), and a Tel URI.

11. The method of claim 1, wherein the physical proximity is detected by a wireless personal area networking communications protocol, wherein the wireless personal area networking communications protocol is selected from one of: a Bluetooth wireless communication protocol, an 802.11a-g wireless communication protocol, an infrared (IR) wireless communication protocol, a Family Radio Service (FRS) wireless communication protocol, a Near Field Communications (NFC) wireless connection protocol, and a frequency modulation (FM) wireless communication protocol.

12. A method for sharing service identity between at least two client devices in a real-time communications network, the method comprising:
registering a first client device with a server on the real-time communications network, the first client device registering with a shared service identity, wherein the first client device becomes an active client device;
when at least one additional client device enters a physical proximity of the first client device,
when at least one additional client device enters a physical proximity of the first client device; establishing a personal area network connection between the first client device and at least one additional client device;
registering the at least one additional client device with the server, the at least one additional client device registering with the shared service identity, wherein the at least one additional client device becomes the active client device and the first client device becomes a waiting device, wherein the waiting device discontinues communication with the server;
updating the at least one additional client device by the first client device with status information over a peer-to-peer protocol to maintain incoming session barring and session integrity;
on a state change, updating the first client device by the at least one additional client device with the status information; and
when the first client device leaves the physical proximity of the at least one additional client device as detected by the personal area network connection, re-registering the first client device with the server on the real-time communications network, the first client device registering with the shared service identity, wherein the first client device becomes the active client device and the at least one additional client device becomes the waiting device.

13. The method of claim 12, further comprising:
establishing a session on the first client device, wherein said session is established after registering the first client device;
after registering the at least one additional client device; leaving the session by the first client device; and
joining the session by the at least one additional client device, wherein the session is transferred to the at least one additional client device;
continuing the session on the at least one additional client device;
after re-registering the first client device;
leaving the session by the at least one additional device; and
joining the session by the first client device, wherein the session is transferred to the first client device; and
continuing the session on the first client device.

14. The method of claim 12, wherein the registering of the first client device is performed by one of: automatically registering when the first client device is within the physical proximity of the at least one additional client device, and manually registering upon a user input when the first client device is within the physical proximity of the at least one additional client device.

15. The method of claim 12, wherein the re-registering of the first client device is performed by one of automatically re-registering when the first client device leaves the physical proximity of the at least one additional client device, and manually re-registering upon a user input when the first client device leaves the physical proximity of the at least one additional client device.

16. The method of claim 13, wherein the session is a push-to-talk over cellular (PoC) session, wherein the first client device and the at least one additional client device are PoC client devices, wherein the server is a PoC server, and wherein the real-time communications network is a PoC enabled network.

17. The method of claim 12, wherein the real-time communications network is selected from one of: a VOIP enabled network, a video conference multimedia enabled network, wherein the network utilizes a communication path selected from one of: a simplex media path and a full-duplex media path.

18. A system suitable for utilizing at least two client devices with a shared service identity over a real-time communications network, the system comprising:
a first client device including the shared service identity configured to:
register with a server in the real-time communications network using the shared service identity;
transfer a session control to a second client device in response to detection and registration of the second client device in the real-time communications network, wherein the second client device becomes the active client device and the first client device becomes a waiting device, wherein the waiting device discontinues communication with the server;
the second client device including the shared service identity configured to:
register with the server in the real-time communications network using the shared service identity,
update the first client device to maintain a session integrity; and
transfer the session control to the first client in response to detection and re-registration of the first client device in the real-time communications network, wherein the first client device becomes the active client device and the second client device becomes a waiting device, wherein the waiting device discontinues communication with the server;
wherein the first client device and the second client device are configured to provide a personal area network connection for detecting a physical presence of the at least two client devices and for enabling a peer-to-peer protocol for inter device communications; and
the server configured to:
accept a non-simultaneous registration from at least one of the first client device and the second client device over the real-time communications network; and
allow the first client device and the second client device to join and leave the session.

19. The system of claim 18, wherein the peer-to-peer protocol is configured for handling incoming session barring and maintaining session integrity, and wherein the peer-to-peer protocol is further configured for updating the first client device by the second client device with status information on a state change.

20. The system of claim 18, wherein the session is a push-to-talk over cellular (PoC) session, wherein the first client device and the second client device are PoC client devices, wherein the server is a PoC server, and wherein the real-time communications network is a PoC enabled network.

21. The system of claim 18, wherein the shared identity is an identity selected from one of: a Session Initiation Protocol Uniform Resource Identifier (SIP URI), and a Tel URI.

22. The system of claim 18, wherein the real-time communications network is selected from one of: a VOIP enabled network and a video conference multimedia enabled network, wherein the network utilizes a communication path selected from one of: a simplex media path and a full-duplex media path.

* * * * *